TERMINAL ENCLOSURE FOR BURIED CABLE PLANT

Original Filed April 22, 1970 7 Sheets-Sheet 1

INVENTOR
Douglas L.P. Hamilton
BY
ATTORNEY

TERMINAL ENCLOSURE FOR BURIED CABLE PLANT

Original Filed April 22, 1970 7 Sheets-Sheet 2

INVENTOR
Douglas L.P. Hamilton
BY Sue Milton Jones
ATTORNEY

TERMINAL ENCLOSURE FOR BURIED CABLE PLANT

Original Filed April 22, 1970 7 Sheets-Sheet 3

INVENTOR
Douglas L.P. Hamilton
BY Ira Milton Jones
ATTORNEY

TERMINAL ENCLOSURE FOR BURIED CABLE PLANT

Original Filed April 22, 1970 7 Sheets-Sheet 4

INVENTOR
Douglas L. P. Hamilton
BY Sidney Miller Jones
ATTORNEY

TERMINAL ENCLOSURE FOR BURIED CABLE PLANT

Original Filed April 22, 1970 7 Sheets-Sheet 5

INVENTOR
Douglas L. P. Hamilton
BY
ATTORNEY

TERMINAL ENCLOSURE FOR BURIED CABLE PLANT

Original Filed April 22, 1970 7 Sheets-Sheet 6

INVENTOR
Douglas L. P. Hamilton
BY Geo. Milton Jones
ATTORNEY

TERMINAL ENCLOSURE FOR BURIED CABLE PLANT

Original Filed April 22, 1970 7 Sheets-Sheet 7

INVENTOR
Douglas L.P. Hamilton
BY Dr. Milton Jones
ATTORNEY

United States Patent Office

Re. 27,746
Reissued Aug. 28, 1973

27,746
TERMINAL ENCLOSURE FOR BURIED CABLE PLANT

Douglas L. P. Hamilton, Jensen Beach, Fla., assignor to Utility Products Co., Milwaukee, Wis.

Original No. 3,604,835, dated Sept. 14, 1971, Ser. No. 30,669, Apr. 22, 1970. Application for reissue Nov. 15, 1972, Ser. No. 306,658
Int. Cl. H02g *9/02*
U.S. Cl. 174—38 13 Claims

Matter enclosed in heavy brackets [ ] appears in the original patent but forms no part of this reissue specification; matter printed in italics indicates the additions made by reissue.

ABSTRACT OF THE DISCLOSURE

A terminal chamber in the top part of a terminal enclosure for a buried cable installation is compartmented by platelike supporting and partition members, both carried by a channel-shaped rear member comprising the main enclosure body. Both compartmenting members are in forwardly spaced generally parallel relation to the rear member web. The supporting member, near the bottom of the terminal chamber supports upright stretches of cable and service lines. The partition member, spaced above it, has spliced conductors and an unassigned conductor loop secured to and overlying its front face, while a loop of unassigned conductors lies behind it.

This invention relates to above-ground splice and connection enclosures for buried cable installations, and the invention is more particularly concerned with means in such a terminal enclosure for maintaining a neat and orderly arrangement of spliced and unspliced conductors of a cable and for effectively requiring that the cable, the service leads and the connections in the enclosure be installed and maintained in a predetermined arrangement that facilitates later work that may be done on the installation.

While the invention is applicable to other types of buried cable installations, such as power utilities, it probably has its greatest value in connection with telephone cable installations, and therefore it is herein explained, for purposes of illustration, with specific reference to telephone systems.

An underground telephone cable must be looped up above the surface at spaced intervals of a quarter of a mile or less to be accessible for cable-to-cable splicing and for connections with service lines to subscribers' telephones. At each such above-ground location the cable loop and the connections to it are protected by a terminal enclosure that is either mounted on a post or is self-supporting.

Heretofore terminal enclosures have comprised little more than a housing for the above-ground portion of the plant, to protect it from the elements and from unauthorized access, together with some means for supporting the cable loop to hold it in a position to be accessible when the enclosure was opened. No provision was made for an orderly arrangement of the various splices and connections housed in the enclosure and of the unspliced assigned and unassigned conductors in the cable loop. As a result, a telephone installer or service man who opened a terminal enclosure was likely to be confronted with a disorderly snarl of cable, connector, wires and splices that greatly complicated his essential task of tracing conductor pairs.

A great deal of expensive time was wasted because of this condition, but equally important was the detrimental effect upon morale that resulted from confusion and disorganization at the very points in the plant where it was essential that service, maintenance and installation work be done methodically and systematically.

This condition of poor housekeeping in buried cable terminal enclosures has persisted for many years. Apparently it has heretofore been accepted as inevitable. The present invention is based upon a recognition that installation and maintenance crews can and will achieve neat and orderly arrangements inside terminal enclosures provided the construction of the enclosures encourages neatness and orderliness, and especially if it is such as to make disorderliness nearly impossible. Thus, it is a premise of this invention that the good housekeeper's objective of having everything in its place cannot be achieved unless there is a place for everything.

Hence it is a general object of the present invention to provide means in a terminal enclosure of the character described for establishing and compelling a neat and logical arrangment of the wiring that is to be housed in the enclosure, so that an orderly, easily serviced installation is not merely encouraged but is practically enforced.

For a better understanding of the objects and nature of the invention it should be explained at this point that the conductors in a terminal enclosure of the character here under consideration comprise assigned and unassigned conductors of the cable, service lines, and spliced leads. Unassigned conductors of the cable are those that merely pass through the terminal enclosure on the way to connections at other locations, and which therefore can be expected to need attention only rarely, if ever. Service lines are those conductors which extend between the enclosure and subscribers' houses to connect subscribers' instruments with the cable, and they are of course connected with the proper conductors of the cable by splices. Assigned conductors are those strands of the cable that are either connected with service lines entering the terminal enclosure or designated for future connection with service lines to be run to it.

Bearing in mind these different categories of conductors to be accommodated, it is another object of this invention to provide a terminal enclosure of the character described that has means therein for isolating from the remainder of the installation the unassigned cable conductors, to which access is seldom necessary, and for disposing them in a substantially protected zone where they can nevertheless be accessible when occasion demands; for supporting all assigned cable conductors in a directly accessible zone; for disposing all spliced conductors in another directly accessible zone; and for supporting service lines separately from the cable.

It is also an object of this invention to achieve a logical and orderly compartmentation of the interior of a terminal enclosure of the character described by means of a simple partition member therein that is swingable between normal and access positions and is also readily removable.

Another and more specific object of this invention is to provide a terminal enclosure of the character described that has a readily removable partition member which separates the unassigned conductors of the cable from the assigned conductors, serves as a support for the splices and the assigned conductors whereby they are neatly held in separate zones, and provides a white background for conductors that are likely to require attention, to facilitate reference to their color coding.

A further object of this invention is to provide a terminal enclosure of the character described which can accommodate either a cable-to-cable connection, or connections between a cable and one or more subscriber service leads, and which, in either case, makes for a neat and orderly installation.

With these observations and objectives in mind, the manner in which the invention achieves its purpose will be appreciated from the following description and the accompanying drawings, which exemplify the invention, it being understood that such changes in the specific apparatus disclosed herein may be made as come within the scope of the appended claims.

The accompanying drawings illustrate several complete examples of embodiments of the invention constructed according to the best modes so far devised for the practical application of the principles thereof, and in which.

Figure 1:
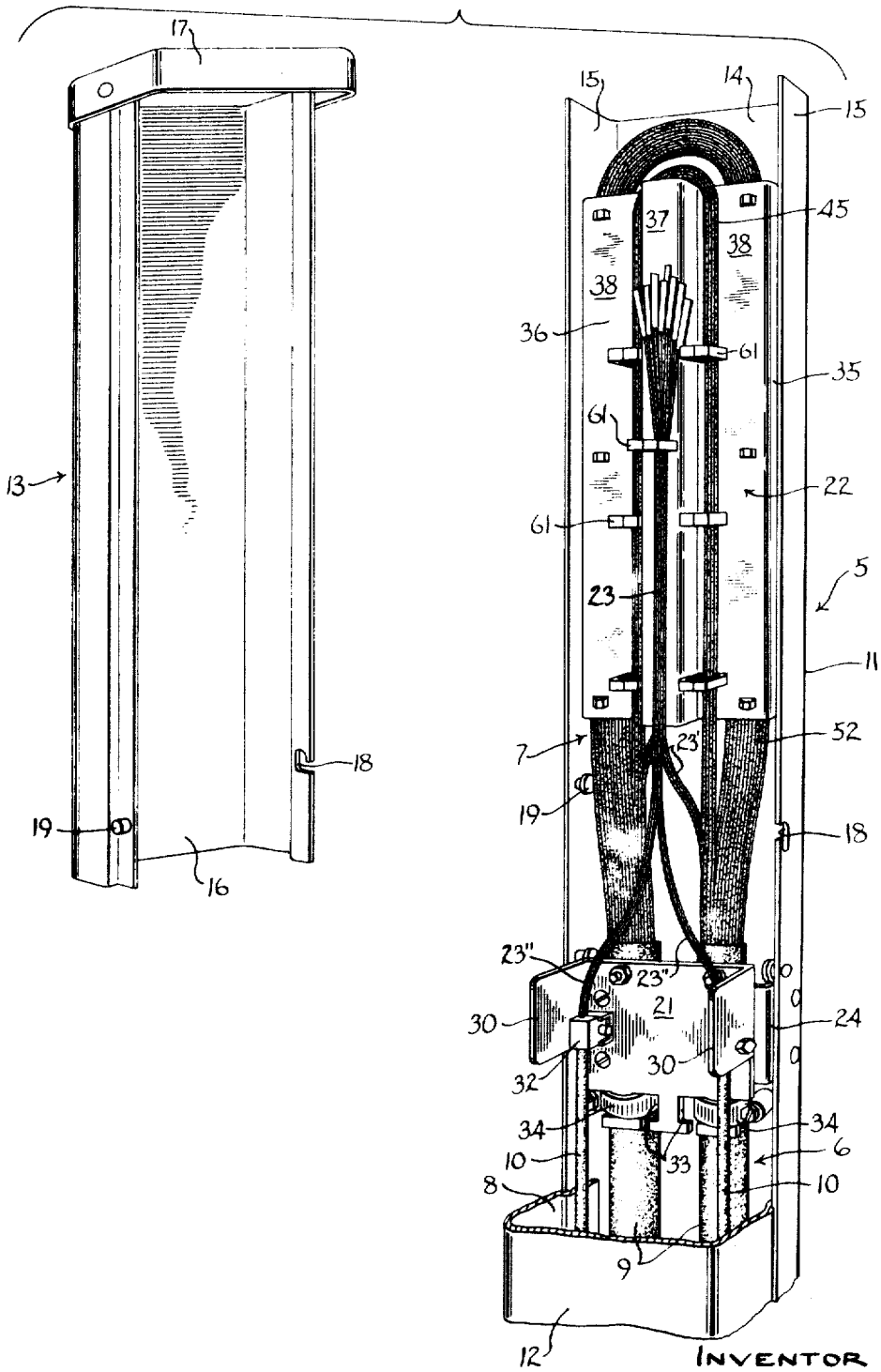
FIG. 1 is a perspective view of the upper portion of a terminal enclosure embodying the principles of this invention, as seen from the front, with its cover member removed.
Figure 2:
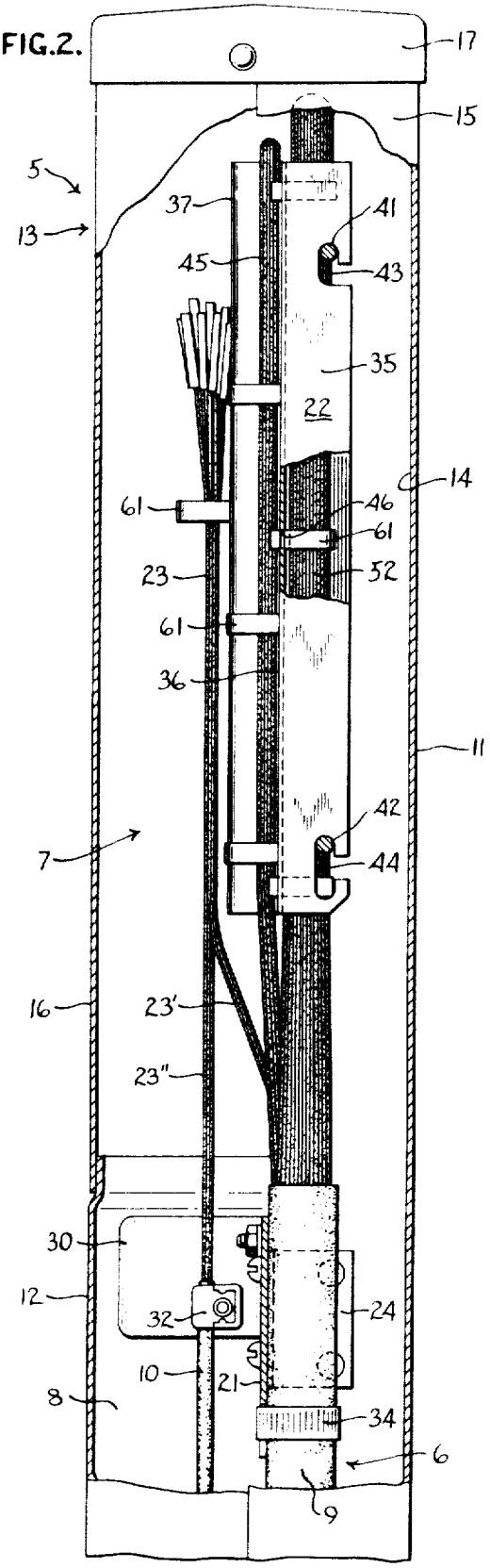
FIG. 2 is a vertical sectional view of the terminal enclosure taken on a fore-and-aft extending plane that is just inside the nearer flange of the rear member.
Figure 3:
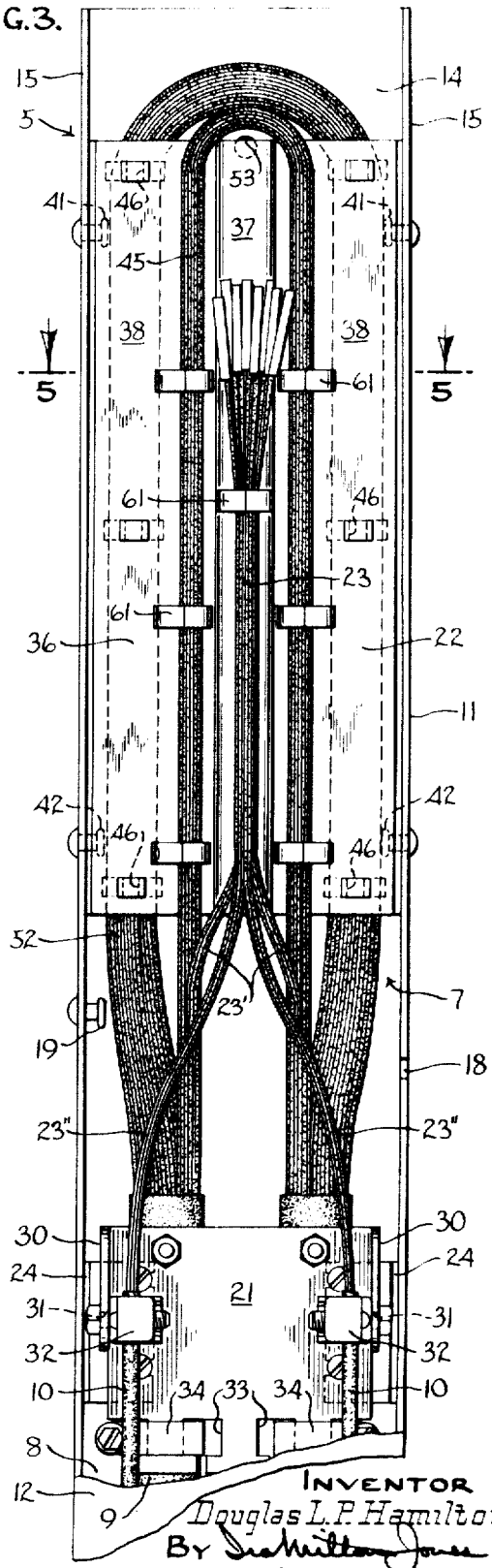
FIG. 3 is a view of the terminal enclosure in front elevation, with the cover removed.

Referring now more particularly to the accompanying drawings, the numeral 5 designates generally an enclosure for above-ground terminals of a buried cable plant, which terminal enclosure-embodies the principles of the present invention. The enclosure is generally in the nature of a hollow post that is open at its bottom so that a loop of a buried cable, designated generally by 6, can extend above ground level in it to be accessible for connections. The upper portion of the enclosure provides a terminal chamber 7 in which the splices and connections are housed, while its lower portion, which is adapted to be partially buried, comprises a tube 8 to which the terminal chamber 7 opens downwardly and through which extend the upright stretches 9 of the cable loop and of service lines 10 that are connected with assigned conductors of the cable.

Structurally the terminal enclosure comprises a rear channel member 11 which extends the full height of the enclosure, a lower front channel member 12, and a generally L-shaped cover member 13. The rear channel member 11, which carries all of the other elements of the enclosure and is adapted to be driven a distance into the ground, has a web portion 14 that defines the rear wall of the enclosure and forwardly projecting flanges 15.

The lower front channel member 12 can be detachably secured to the rear member 11, with its rearwardly projecting flanges snugly engaging the forwardly projecting flanges 15 of the rear member to cooperate with them in defining the tubular bottom portion 8 of the enclosure. The lower front channel member is preferably removable from the rear member to facilitate getting the cable loop legs and service lines into the enclosure, after which the lower front channel is replaced and partially buried by back filling the hole in which the terminal enclosure is set and through which the cable loop and service lines are brought out of the ground. The lower front channel member is not ordinarily removed for service and maintenance operations.

The cover member 13 cooperates with the upper portion of the rear member 11 to define the upwardly elongated terminal chamber 7 at the top of the enclosure. The cover member comprises a channel portion 16 having the same cross section as the lower front channel 12 and a cap 17 that fits over the upper edge portions of the rear member 11. Cooperating with the cap to readily releasably hold the cover member in place on the rear member are securement means on the flanges of those two members, near the bottom of the cover member, comprising slots 18 engageable with laterally projecting pins 19 such as shoulder rivets or screws.

It is a feature of this invention that the interior of the terminal chamber 7 is more or less divided or compartmented into defined zones by a removable platelike supporting member 21 and a removable divider plate or partition member 22, both of which are supported by the rear member 11 and extend transversely across it in forwardly spaced generally parallel relation to its rear wall or web portion 14. The supporting member 21, which is relatively short heightwise, is spaced a small distance above the lower front channel 12. The longer partition member 22 extends through a substantial portion of the height of the terminal chamber 7 but has its lower edge spaced a distance above the supporting member and its upper edge spaced below the top of the rear member.

The purpose of the supporting member 21 is to support the upright cable stretches 9 and service lines 10 that extend down through the tube 8, and to isolate the cable loop from the service lines. The cable lies behind the supporting member while the service lines are disposed in front of it.

To hold the supporting member in place it has rearwardly projecting flanges 24 at its opposite sides that are closely received between the flanges 15 of the rear member and are secured to them.

Figure 10:
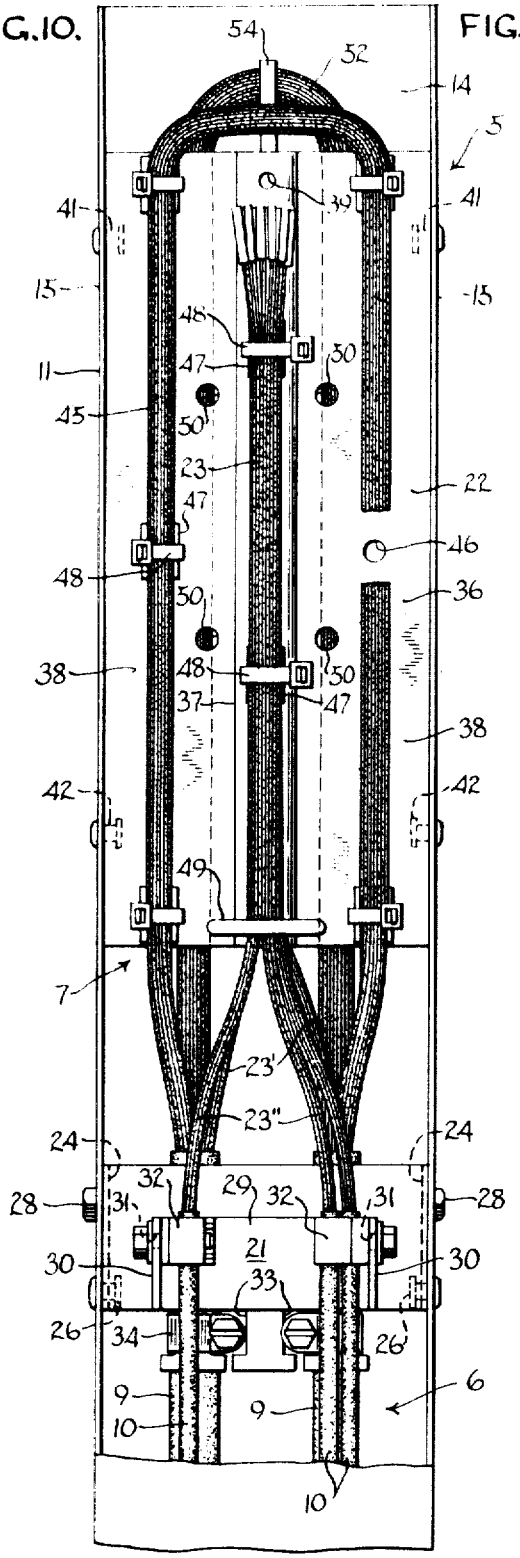
FIG. 10 is a view similar to FIGS. 3 and 8 but showing the terminal enclosure with another type of installation and with a modified form of supporting member.
Figure 11:
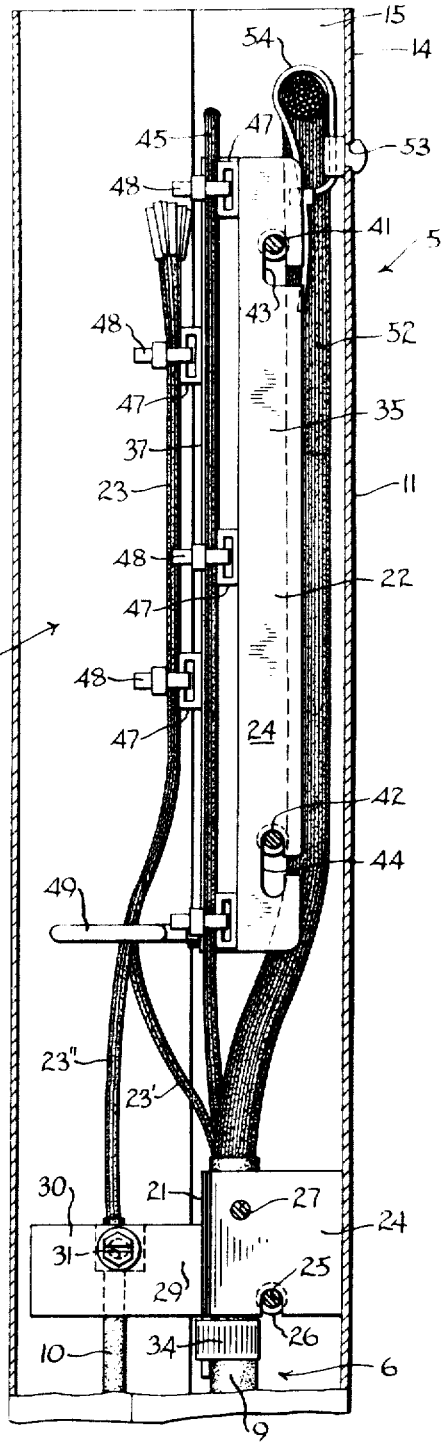
FIG. 11 is a view generally similar to FIGS. 2 and 7 but illustrating the terminal enclosure of FIG. 10.

As shown in FIGS. 10 and 11, the supporting member can be made demountable. To this end its flanges 24 have slots 25 which open to their bottom edges and which engage coaxial shouldered rivets 26 that project inwardly from the flanges 15 of the rear member, and it also has a threaded hole 27 in each of its flanges, near the top thereof, in which is received a hex-headed screw 28 that extends through the adjacent rear member flange 15.

The supporting member also comprises a pair of forwardly projecting arms 30, one near each side of it, for supporting service lines. As shown in FIGS. 10 and 11, these comprise the legs of a U-shaped bracket 29 that has its bight portion flat-wise overlying and fastened to the front surface of the supporting member body. The arms 30 have holes 31 that receive the mounting screws of Fargo connectors 32 or similar clamplike fasteners that engage the service lines. One or more holes can also be provided in the medial portion of the supporting member, and it will be understood that any of the holes in it can be used for connection of a grounding clamp or conductor inasmuch as the supporting member is made of bare metal, has a good electrical connection with the rear member and can be readily grounded to metal sheathing on the cable.

Opening to the lower edge of the platelike supporting member body are T-shaped slots 33 that define necks around which cable clamps 34 can be secured. Each cable clamp can be a conventional hose clamp that embraces one of the necks and the sheathed leg 9 of a cable behind the supporting plate.

The partition member or divider plate 22 is generally channel-shaped in cross section, having flanges 35 that project rearwardly from opposite sides of its web portion 36 to be received between the flanges 15 of the rear member. It defines a rear compartment in the terminal chamber in which the loop 52 of unassigned conductors of the cable is housed, more or less isolated from the remaining conductors of the installation, and it serves as a protection for the unassigned conductors and also as a support for the spliced conductors and the unconnected but assigned conductors of the cable.

The flanges 35 of the partition member have upper and lower pairs of disengageable connections with the flanges 15 of the rear member. As shown, these connections comprise pins or shouldered rivets 41 and 42 that project inwardly from the flanges 15 of the rear member, and slots 43 and 44 in the flanges 35 of the partition member, opening to their rear edges. An upper pair of the pins, designated 41 and cooperating with the upper slots 43, project laterally inwardly, coaxially with one another, from the flanges 15 of the rear member, while the pins of the lower pair designated 42, are similarly arranged and cooperate with the lower slots 44 in the partition member.

When both pairs of its connections with the rear member are engaged, the partition member is maintained in its normal position in which it divides the interior of the connection chamber into front and rear upper compartments. When the partition member is lifted slightly to disengage the upper pair of connections, it can be swung about the lower pair of connections (which then serve as a hinge) to bring it to an acess position (illustrated in FIG. 4) in which its upper end is spaced a substantial distance forwardly of the rear member and in which its web portion is disposed at a forwardly and upwardly inclined oblique angle to the web portion of the rear member. For complete removal, the lower pair of connections can be disengaged by further lifting the partition member slightly and moving it bodily forward. The upper slots 43 are substantially L-shaped while the lower slots 44 are preferably substantially T-shaped to prevent inadvertent displacement of the partition member off of the lower pair of pins 42 when the partition member is being swung forward to its access position.

Midway between the flanges 35 of the partition member its web portion has a bend that is U-shaped in cross section to provide a forwardly projecting rib or spine 37 that extends lengthwise along it. The front wall of this rib is thus forwardly offset relative to the remainder of the web, to define a zone in which the spliced end portions 23 of service lines and cable conductors are located, while the coplanar web surfaces 38 at opposite sides of the rib define zones in which are secured the upright stretches of a loop 45 of assigned conductors of the cable. Preferably at least the front surface of the partition member is painted white, to facilitate selection of the color-coded conductors to which connections are to be made.

The front wall of the rib 37 has holes 39 at intervals along its length that provide for securement to the partition member of tie straps or connector blocks for the spliced leads and/or a grounding conductor 60 connected with the supporting plate. FIGS. 1–5 illustrate an installation in which a resilient cliplike tie connector 61 is secured to the front wall of the rib by means of an integral resiliently compressible tit 62 which is forced through a hole in the rib from the front thereof. The spliced conductors 23, which extend along the rib, are gathered and held in this clip. FIGS. 6–9 illustrate an installation in which the connections are made at connector blocks 64 to which the leads are brought and which serve as lightning arresters, being sometimes referred to as protected blocks. The mounting screws 65 for these blocks extend through holes in the rib and provide a connection to one end of a grounding conductor 60 that is connected at its other end to the supporting member. With the protected blocks secured to the front surface of the forwardly offset rib 37, binding posts at the sides of the blocks are spaced well forward of the coplanar web surfaces 38 to be readily accessible. FIGS. 10 and 11 show the connected leads 23 extending along the rib and fastened by another type of connector comprising a slotted block 47 of resilient but rather hard plastic material having an integral tit that can be pressed through a hole in the partition member, and a plastic tie strap 48, with an integral buckle or clip portion, which is passed through the slot in the block and tightened around the conductors. The rear end portion of the tits, screws or other fasteners for such connector blocks and the like are accommodated in the bay or recess 40 which the rib defines at its rear, so that the rib holds them away from contact with the cable conductors 52 that lie behind the partition member.

The partition member also has holes 46 and 50 in its coplanar web portions 38 at opposite sides of the rib 37, to provide for securement of a loop 45 of assigned cable conductors by means of clips or tie connectors such as those above described.

It will now be apparent that the supporting plate and the partition member provide a logical compartmentation and definition of zones in the interior of the terminal enclosure whereby the making of a neat and orderly installation is practically compelled.

The loop 52 of unsheathed unassigned conductors of the cable comes directly up from the sheathed upright cable stretches 9 behind the supporting member, and it lies behind the partition member, normally protected by it but readily accessible upon swinging the partition member to its access position. The loop 45 of assigned but unconnected conductors comes up from the cable sheath butts at a forward and upward inclination to overlie the coplanar surfaces 38 on the front of the partition member at opposite sides of the rib 37, with its bight portion spaced a small distance above the top of the partition member so as to bridge over the rib. The spliced conductors 23' of the cable come up out of the cable sheath butts at a forwardly and laterally inward inclination to overlie the rib 37, and the spliced service line conductors 23'' come up out of the service line sheaths (on the arm 30 in front of the supporting plate) at a laterally inward inclination, to extend up the rib alongside the cable conductors to which they are spliced.

To insure that all of the spliced conductors will be neatly arranged, straight along the front surface of the rib, an eyebolt 49 can be secured to the partition member, projecting forwardly from the bottom of the rib, to serve as a sort of collector through which all spliced conductors must be brought. When splicing operations are in progress, conductors to be connected can be temporarily bent down over the ring of the eyebolt to physically separate them from the rest of the conductors along the rib, thus facilitating identification.

Figures 4, 12:
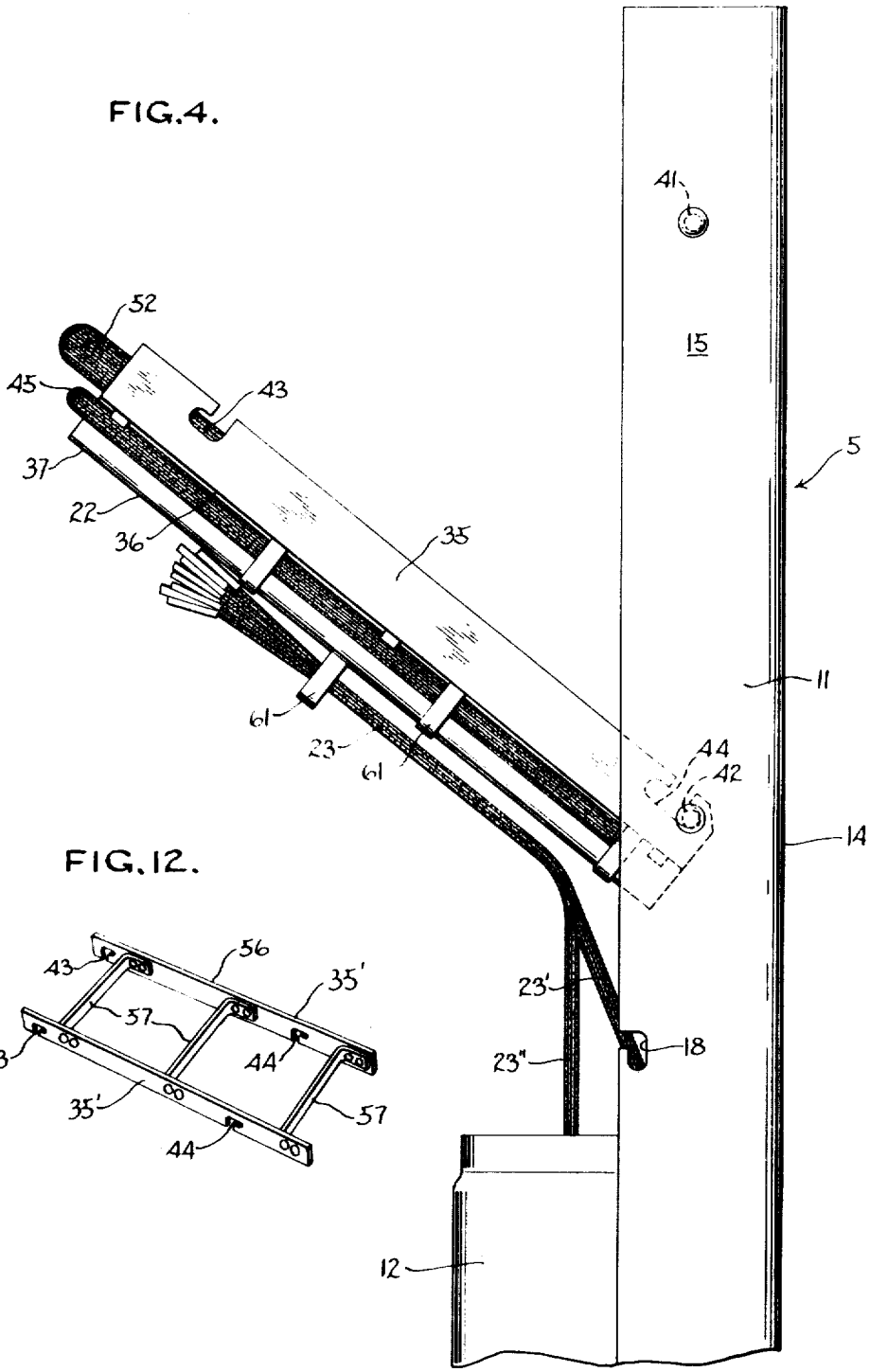
FIG. 4 is a view of the terminal enclosure in side elevation with the partition member swung to its access position.
FIG. 12 is a perspective view of a modified form of partition member for use when the terminal enclosure houses a cable-to-cable splice.
Figure 5:
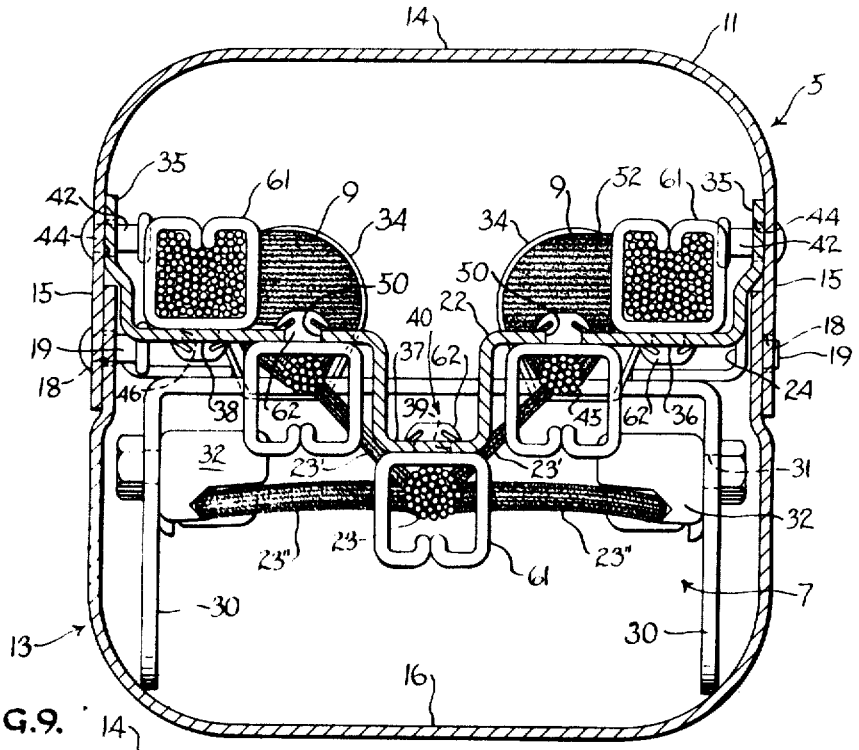
FIG. 5 is a sectional view taken on the plane of the line 5—5 in FIG. 3.
Figure 9:
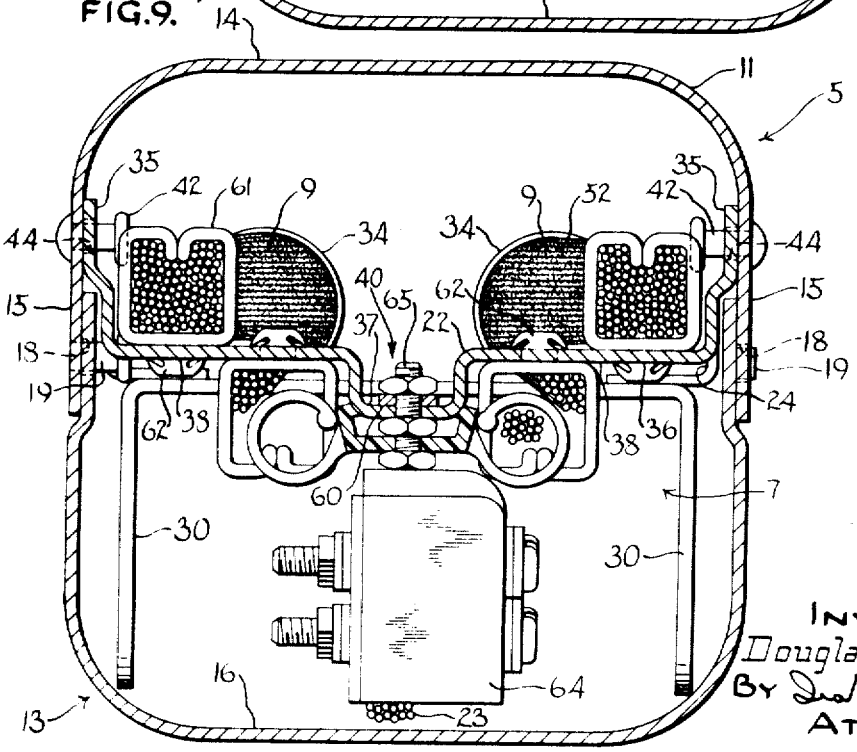
FIG. 9 is a sectional view taken on the plane of the line 9—9 in FIG. 8.
Figure 6:
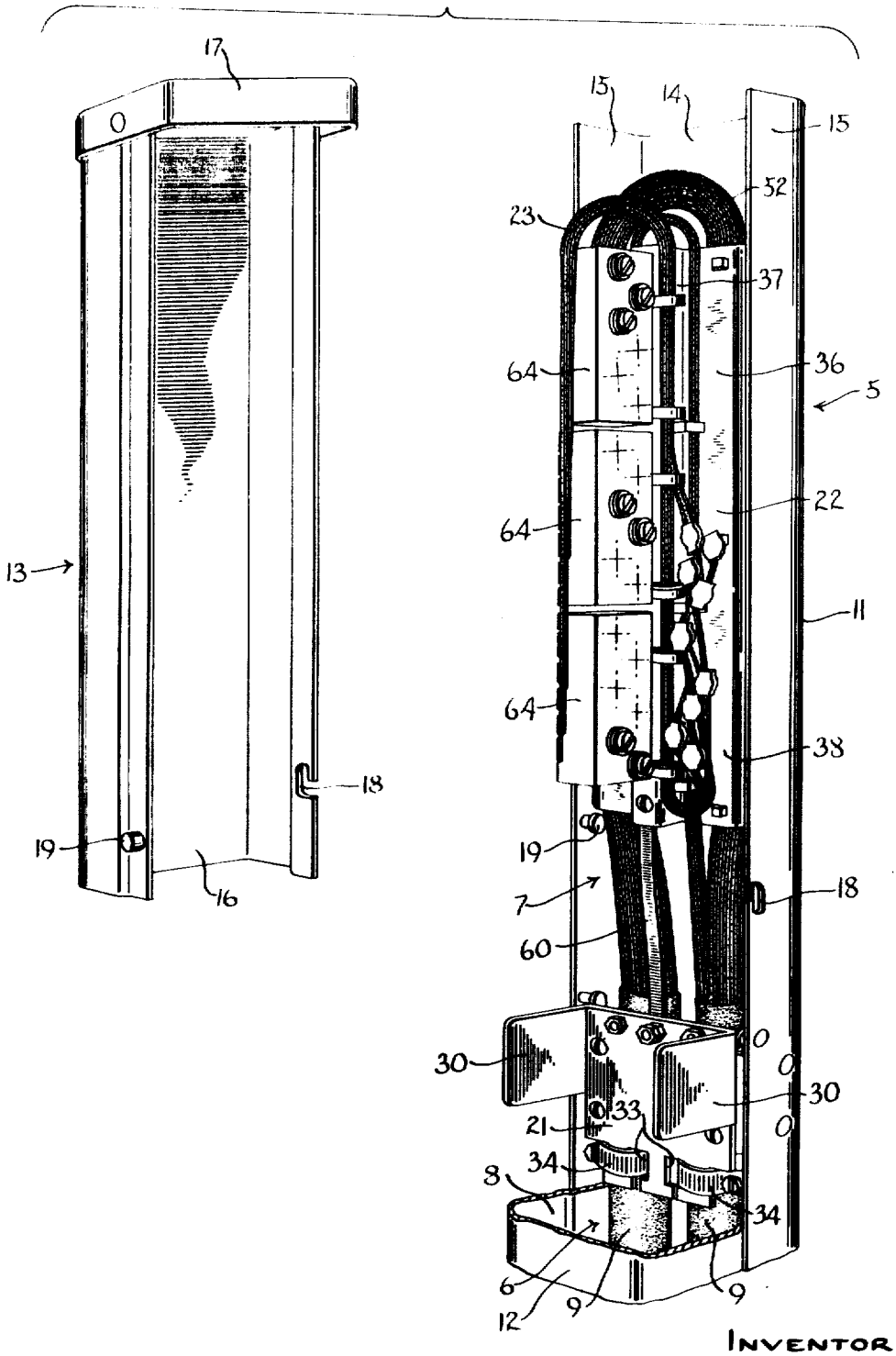
FIG. 6 is a perspective view generally similar to FIG. 1 but illustrating the enclosure with an installation having connecting blocks.
Figure 7:
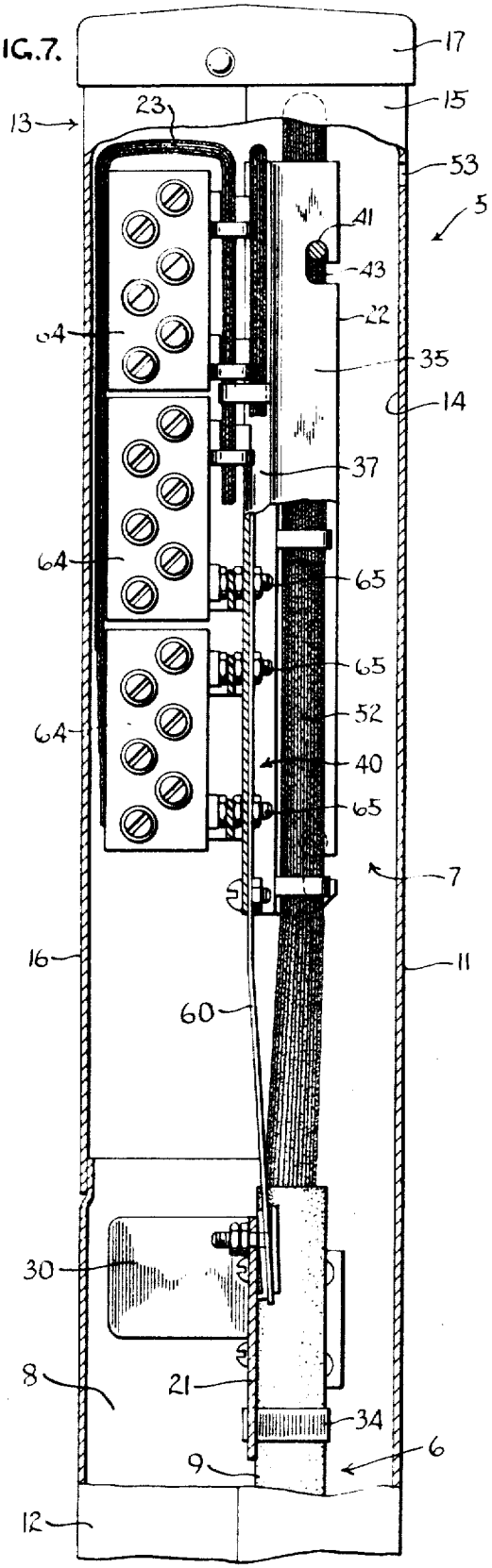
FIG. 7 is a vertical sectional view of the terminal enclosure illustrated in FIG. 6 taken on a fore-and-aft extending plane just inside the nearer flange of the rear member.
Figure 8:
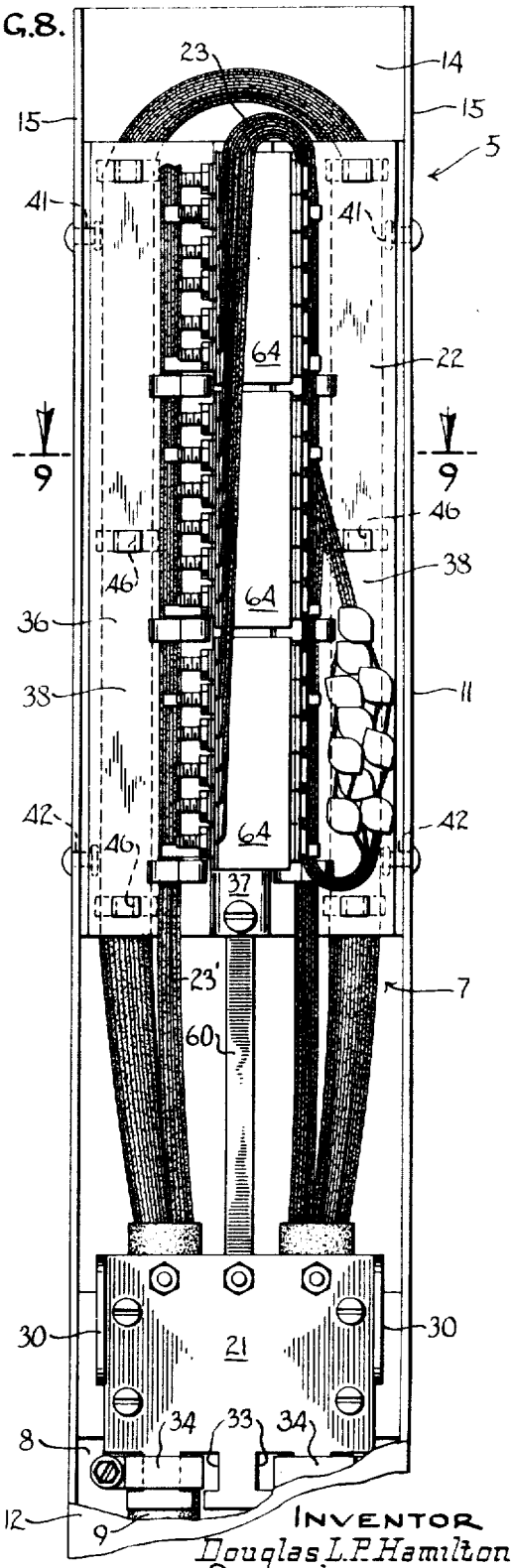
FIG. 8 is a view in front elevation (cover removed) of the terminal enclosure shown in FIGS. 6 and 7.

The upper portion of the loop 52 of unassigned conductors of the cable can be secured either to the upper portion of the partition member web, as illustrated in FIGS. 1 through 9, or to the web portion 14 of the rear member, as illustrated in FIGS. 10 and 11. If the loop of unassigned conductors is fastened to the back of the partition member, the tits of connectors can be inserted into the holes 46 in the partition member from the back of it, to hold the legs of that loop, and the holes 50 can then be used for connectors for the unassigned conductor loop. In most cases, however, it is preferable to secure the unassigned conductors to the rear member, which has a hole 53 near its top, midway between its flanges, to receive a tie connector 54 that is fastened around the bight portion of the unassigned conductor loop, as illustrated in FIGS. 10 and 11. With that arrangement a sleeve or envelope of Plyofilm or the like (not shown) can be slipped over the loop of unassigned conductors before they are tied in place, to keep the conductors bundled together and to protect them from moisture and scuffing. The tie strap that secures that bight portion of the loop passes through a slot in this sleeve.

Where the terminal enclosure of this invention is employed to house spliced connections between two lengths of cables, the above described platelike partition member can be replaced by the ladderlike partition member 56 that is illustrated in FIG. 12, which serves as a splice support. Its parallel upright members 35' correspond to the flanges 35 of the platelike partition member and have similar slots 43 and 44 to provide for its detachable connection to the rear member. The two cables coming into the enclosure are clamped to the supporting plate and their unsheathed conductors are brought up behind the splice support, being left long enough to extend a substantial distance above it so that they can be folded down over it after splicing. The runglike transverse members 57 of the splice support hold the upwardly extending stretches of the unsheathed conductors neatly against the web portion 14 of the rear member.

From the foregoing description taken with the accompanying drawings it will be apparent that this invention provides a terminal enclosure for underground telephone cable and similar buried plant that virtually enforces the making of a neat, well-organized installation whereby subsequent service work is greatly facilitated.

Those skilled in the art will appreciate that the invention can be embodied in forms other than as herein disclosed for purposes of illustration.

The invention is defined by the following claims:

1. An enclosure for above-ground terminals of a buried cable installation, which enclosure comprises an upright channel-shaped rear member having a web portion and forwardly projecting flange portions, and front cover means detachably securable to the rear member and cooperating therewith to define a terminal chamber at the top of the enclosure into which upright portions of buried cable and service lines can extend from the ground and in which their connections can be accessibly housed, said enclosure being characterized by:

(A) a supporting member extending transversely across the rear member near the bottom of the terminal chamber, in forwardly spaced relation to the web portion of the rear member;

(B) means on the supporting member for securing upright cable stretches thereto and supporting the same in the space between the supporting member and the web portion of the rear member;

(C) means on the supporting member for securing upright stretches of service lines thereto and supporting the same in front of the supporting member;

(D) a partition member having a length to extend through a substantial portion of the height of the terminal chamber and a width to substantially bridge the flanges of the rear member;

(E) means for readily detachably securing the partition member to the flanges of the rear member, to hold the partition member in forwardly spaced substantially parallel relationship to the web portion of the rear member, with the lower edge of the partition member spaced above the supporting member and with its upper edge spaced below the top of the rear member, so that the partition member defines a rear compartment in the terminal chamber that can house portions of cable conductors to which access is not normally required; and (F) means on the partition member, at spaced-apart zones thereof, for supporting at the front of the partion member conductors to which access may be required.

2. The terminal enclosure of claim 1, further characterized by:

(A) said means on the supporting member for securing upright cable stretches thereto comprising slots in the supporting member, near its bottom, in which a hose-type clamp can be engaged; and (B) said means on the supporting member for securing upright stretches of service lines thereto comprising (1) a pair of laterally spaced apart arms projecting forwardly from the supporting member, and (2) means on each of said arms for securing a clamp thereto.

3. The terminal enclosure of claim 1, further characterized by:

(A) the partition member being substantially channel-shaped, with flanges projecting rearwardly from [its] *a* web portion and received between the flanges of the rear member; and (B) said means for readily detachably securing the partition member to the rear member comprising (1) inwardly projecting pins on the flanges of the rear member engageable in (2) slots in the flanges of the partition member, said pins and slots being arranged to permit the partition member to be partially disengaged and swung to an access position in which it is held on the rear member at a forward and upward inclination to the web portion of the rear member.

4. The enclosure of claim 1, further characterized by:

(A) the partition member having a forwardly projecting rib extending lengthwise therealong and defining a narrow medial surface that is forwardly offset from a pair of coplanar surfaces, one at each side of the rib; and (B) said conductor supporting means on the partition member being so disposed that certain of the conductors to which access may be required overlie each of said coplanar surfaces and others overlie said medial surface.

5. In an enclosure for above-ground terminals of a buried cable installation, which enclosure comprises an upright channel-shaped rear member having a web portion and forwardly projecting flanges, and removable closure means cooperating with the rear member to define a vertically elongated terminal chamber at the top of the enclosure that houses assigned conductor of a cable, to which access must be had for the making of connections, an unassigned conductors of the cable to which access need not normally be had:

(A) an upright partition member in the terminal chamber, extending through a substantial portion of its height in a forwardly spaced relation to the web portion of said rear member and transversely between the flanges of said rear member, to divide the terminal chamber into a rear compartment for unassigned conductors and a front compartment in which assigned conductors are readily accessible;

(B) means at spaced-apart zones on the partition member for securing assigned conductors to the front thereof; and (C) means providing detachable connections between the partition member and said rear member, so arranged that the upper end of the partition member can be swung away from the rear member to dispose the partition member at a forward and upward inclination to the web portion of the rear member, and the partition member can be wholly detached from the rear member.

6. In an enclosure for the above-ground terminals of an installation comprising a buried cable having numerous conductors, and service lines connected with certain of said conductors, which enclosure comprises an upright channel-shaped rear member having a web portion and forwardly projecting flanges and removable closure means cooperating with the rear member to define a vertically elongated terminal chamber at the top of the enclosure:

(A) a platelike upright supporting member upwardly adjacent to the bottom of the terminal chamber, said supporting member being supported by the rear member in forwardly spaced relation to its web portion and extending transversely between its flanges;

(B) means on the supporting member for supporting the legs of a loop of cable in the space between the supporting member and the web portion of the rear member; and (C) means on the supporting member for supporting service lines at the front thereof, comprising (1) a pair of forwardly projecting arms on the supporting member, and (2) means on said arms for fastening clamp connectors to them.

7. In combination with an enclosure for above-ground terminals of a buried cable installation, which enclosure comprises an upright channel-shaped rear member having a web portion and forwardly projecting flanges, and removable closure means cooperating with the rear member to define a vertically elongated terminal chamber at the top of the enclosure that houses the connected portions of conductors that extend into the terminal chamber from underground:

(A) a channel-shaped partition member having a length equal to a substantial portion of the height of the terminal chamber and having (1) a web portion in which there are spaced-apart holes for securement of conductor ties to the partition member, and (2) lengthwise extending flanges projecting rearwardly from opposite sides of its web portion, (3) each of said flanges having a pair of slots therein that open to its rear edge, one near each end of the flange; and (B) means on the flanges of the rear member providing laterally inwardly extending pinlike projections, one for each of said slots and which are engageable with said slots to readily detachably mount the partition member on the rear member with the web portion of the partition member in forwardly spaced substantially parallel relation to the web portion of the rear member and substantially spanning the flanges thereof so that the partition member defines a rear compartment in the terminal chamber for conductor portions to which access is not needed and a front compartment in which connections can be accessibly disposed.

8. The combination of claim 7, further characterized by: the web portion of the partition member being bent to provide a forwardly projecting rib that extends lengthwise along the partition member intermediate its flanges and provides a forwardly facing wall portion that is forwardly offset relative to the remainder of said web portion.

9. In combination with a cable which is mainly buried and which comprises a multiplicity of conductors enclosed in a sheath, and a terminal enclosure that opens downwardly and into which the cable loops upwardly to have its conductors accessible above ground, said enclosure comprising a channel shaped rear member having a web portion and forwardly projecting flanges, and a removable closure cooperating with the rear member to define a vertically elongated terminal chamber at the top of the enclosure that houses unsheathed portions of the cable conductors, certain of which are assigned for connections to be housed in the terminal chamber and the remainder of which are unassigned:

(A) a partition member having a web portion of a length to extend through a substantial portion of the height of the terminal chamber and a width to span a substantial portion of the distance between the flanges of the rear member;

(B) means for supporting the partition member on the rear member with the web portion of the partition member in forwardly spaced substantially parallel relation to the web portion of the rear member;

(C) means on the partition member web portion securing to its front surface the assigned unsheathed conductors of the cable so that said assigned conductors are readily accessible for making and servicing of connections to them; and (D) means securing the loop of unassigned conductors of the cable to one of said web portions, in flatwise overlying relation thereto, so that said unassigned conductors are confined to the space between said web portions, out of the way of the assigned conductors and connections to them, and are protected by the partition member.

10. The combination of claim 9, further characterized by:

(E) a service line which extends into the terminal chamber to have its conductors connected with assigned conductors of the cable;

(F) A platelike supporting member carried by the rear member in forwardly spaced substantially parallel relation to its web portion and transversely to its flanges, said supporting member being in the lower portion of the terminal chamber and in downwardly spaced relation to the partition member;

(G) means on the supporting member for supporting sheathed portions of the cable at the rear thereof; and (H) means on the supporting member for supporting the service line at the front thereof.

11. In an enclosure for above-ground terminals of a buried cable installation, which enclosure comprises an upright channel-shaped rear member having a web portion and forwardly projecting flanges, and removable closure means cooperating with the rear member to define a vertically elongated terminal chamber at the top of the enclosure that houses assigned conductors of a cable, to which access must be had for the making of connections, and unassigned conductors of the cable to which access need not normally be had:

(A) an upright partition member in the terminal chamber, extending through a substantial portion of its height, said partition member being substantially channel-shaped in cross section with its flanges projecting rearwardly from its web portion:

(B) means connecting the flanges of the partition member to the flanges of said rear member to support the partition member in forwardly spaced relation to the web portion of said rear member and transversely between the flanges of said rear member, to divide the terminal chamber into a rear compartment for unassigned conductors and a front compartment in which assigned conductors are readily accessible;

(C) means at spaced-apart zones on the partition member for securing assigned conductors to the front thereof;

(D) the web portion of the partition member having a forwardly projecting rib extending lengthwise therealong and defining a narrow medial surface that is forwardly offset from a pair of coplanar surfaces, one at each side of the rib; and (E) said conductor-supporting means on the partition member being so disposed that certain of the conductors to which access may be required overlie each of said coplanar surfaces and others overlie said medial surface.

*12. A terminal enclosure to house an aboveground loop of a buried multiconductor cable and aboveground end portions of buried service lines and connections between the service lines and those of the cable conductors assigned to said service lines, said enclosure comprising:*

*(A) an open-bottomed elongated tubular structure adapted to be set vertically into the ground with its open bottom above the buried cable and its upper end portion above ground to receive the aboveground loop of the cable and the aboveground end portion of said buried service lines,*

*said tubular structure having a top wall, fixedly connected back and side walls that extend for the full length of the tubular structure and a fixed front wall that is shorter than the back and side walls and extends from the bottom of the*

*tubular structure a distance far enough to have its top edge above ground, the space within the tubular structure above the top edge of its fixed front wall defining an elongated above-ground terminal chamber;*

*(B) a removable front wall for the terminal chamber;*

*(C) an elongated partition member in the terminal chamber, said partition member having a length to extend through substantially the full length of the terminal chamber;*

*(D) means to connect the partition member with the fixed side walls of the tubular structure for movement to and from a position overlying that portion of the back wall of the tubular structure which is above the top edge of its fixed front wall to divide the terminal chamber into front and rear compartments, both of which open to the space within the tubular structure beneath the partition member; and*

*(E) means for supporting the cable loop in the terminal chamber with its loop of unassigned conductors confined to the rear compartment and its assigned conductors in the front compartment, to be directly accessible when the front wall of the terminal chamber is removed.*

*13. The terminal enclosure of claim 12 further characterized by means for supporting the above-ground end portions of the service lines in the terminal chamber with the ends thereof in the front compartment,*

*whereby upon removal of the front wall of the terminal chamber, the service lines may be connected to the cable conductors assigned to them and the resulting connections may be serviced whenever necessary,*

*without regard for and without interference from the unassigned cable conductors.*

References Cited

The following references, cited by the Examiner, are of record in the patented file of this patent or the original patent.

UNITED STATES PATENTS

| | | | |
|---|---|---|---|
| 2,953,625 | 9/1960 | Hasselhorn | 174—60 |
| 3,180,920 | 4/1965 | Fletcher et al. | 174—38 |
| 3,257,496 | 6/1966 | Hamilton | 174—38 |
| 3,268,651 | 8/1966 | Stevenson | 174—38 |
| 3,373,276 | 3/1968 | Klein | 174—38 X |
| 3,404,212 | 10/1968 | Mack et al. | 174—38 |
| 3,431,349 | 3/1969 | Hamilton | 174—38 |
| 3,466,380 | 9/1969 | Baumgartner et al. | 174—38 |
| 3,480,721 | 11/1969 | Baumgartner | 174—38 |
| 3,485,932 | 12/1969 | Van Schaack | 174—38 |
| 3,538,236 | 11/1970 | Baumgartner | 174—38 |

OTHER REFERENCES

Bell System Practices—Plant Series, Section 642–235–202, Issue 3, May 1967, AT & T Co. Standard, published and copyrighted 1967 by AT & T Co., 50 pages.

Bell System Practices—Plant Series, Section 631–600–221, Issue 2, October 1967, AT & T Co. Standard, published and copyrighted 1967 by AT & T Co., 26 pages.

LARAMIE E. ASKIN, Primary Examiner

U.S. Cl. X.R.

174—60